Aug. 17, 1943. O. STEINER 2,326,980
CINEMATOGRAPH CAMERA PROVIDED WITH MAGAZINES
Filed Feb. 20, 1937 2 Sheets-Sheet 1

Otto Steiner
Inventor
by Knight
Atty

Aug. 17, 1943.  O. STEINER  2,326,980
CINEMATOGRAPH CAMERA PROVIDED WITH MAGAZINES
Filed Feb. 20, 1937  2 Sheets-Sheet 2
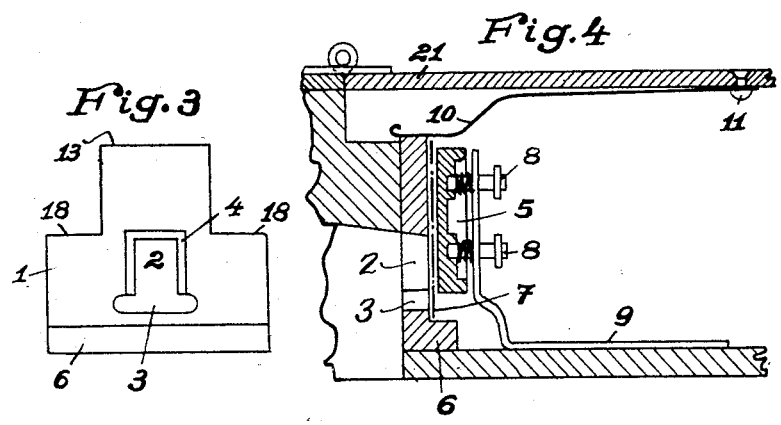
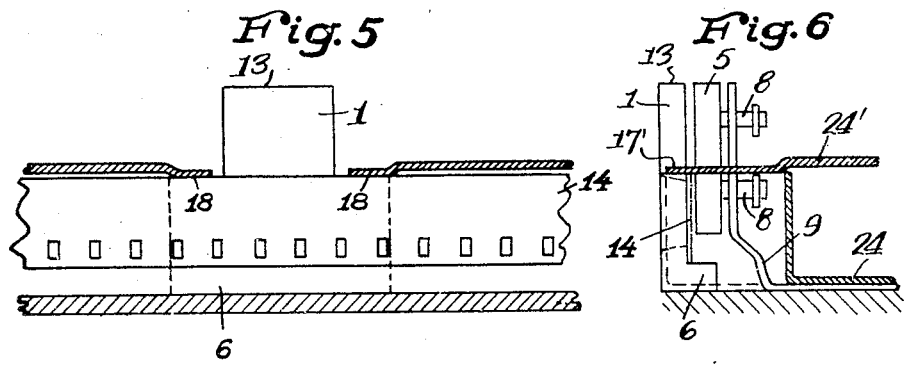
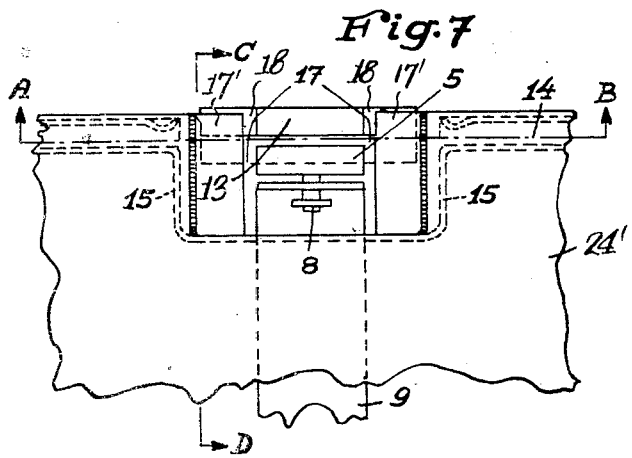

Patented Aug. 17, 1943

2,326,980

UNITED STATES PATENT OFFICE 2,326,980

CINEMATOGRAPH CAMERA PROVIDED WITH A MAGAZINE

Otto Steiner, Berlin-Spandau, Germany; vested in the Alien Property Custodian

Application February 20, 1937, Serial No. 126,870
In Germany February 22, 1936

3 Claims. (Cl. 88—17)

My invention relates to a cinematograph camera provided with a magazine for films of substandard size.

An object of my invention is to provide a cinematograph camera which may be used for taking pictures with films of different sizes, and which allows the changing of a film of one size to a film of a different size by merely exchanging the film magazine.

Another more particular object of my invention is to provide a film camera which is capable of being supplied with a film of substandard size as well as with a film of double width for taking two rows of pictures without making necessary a replacement of parts pertaining to the camera proper.

The advantages of such a camera are self-evident. For producing a film of the substandard size, it is possible to alternately employ without any loss of time a film already cut to the substandard size or a film of the double width which is to be cut into two strips of substandard size after the exposure or the development of the film.

According to my invention, a cinematograph camera is provided with different magazines adapted for films of different sizes or of a different number of picture rolls, and the camera, as well as the magazines, are designed to allow an exchanging of the magazines while using the same fitting and coupling means and the same film guiding means of the camera.

According to the invention, the camera is further provided with a film gate having various supporting surfaces displaced with respect to one another whose distances from a stationary surface employed for the lateral film guide correspond, on the one hand, to a film cut to a restricted width and, on the other hand, to a film having the double width of the film to be produced.

My invention further comprises an automatically advancing guide means, for instance, a plate spring which is arranged on the camera cover besides a stationary lateral guide arranged on the film gate, for guiding a film to be provided with two rows of pictures and to be subsequently cut into two strips.

Another feature of my invention is that in order to employ the cover of a magazine containing the film already cut to the substandard size, for the lateral guide of the film, a recess is arranged in the cover of this magazine at the exposure opening, this recess having a smaller width than the magazine bottom.

Further objects and characteristics of the invention will be apparent from the following description.

In the accompanying drawings are shown some embodiments of my invention in diagrammatic form.

Fig. 3 shows a view of the film gate of the camera, illustrated by Figs. 1 and 2.

Fig. 4 is a cut through the film gate along the optical axis of the camera.

Fig. 5 is a sectional view corresponding to Fig. 1 taken on the line A—B of Fig. 7 showing a film already cut to the substandard size passing through the camera.

Fig. 6 is a sectional view taken on the line C—D of Fig. 7.

Fig. 7 is a plan view of a film gate provided with a pressure plate and a magazine inserted in the camera and partly broken away.

Figure 1:
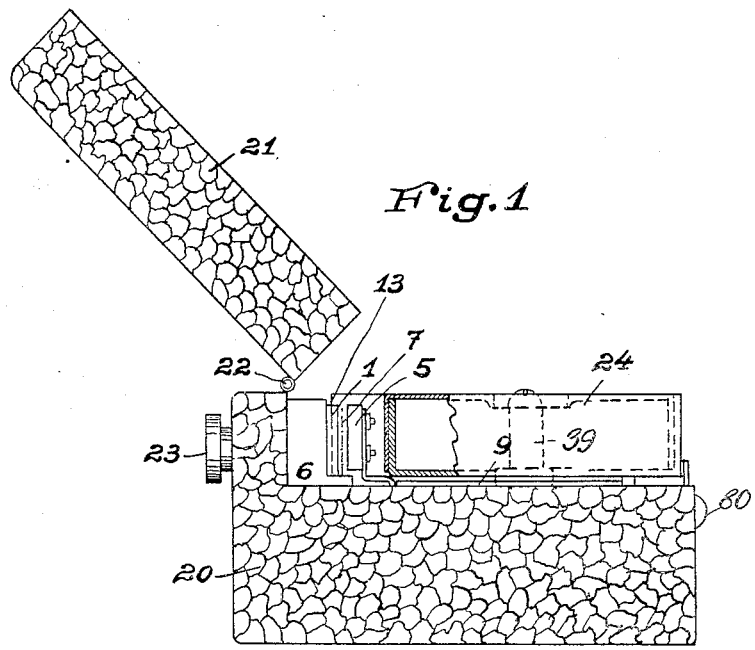
Fig. 1 shows the total view of a cinematograph camera provided with a magazine according to the invention with open camera cover and magazine partly shown in section.
Figure 2:
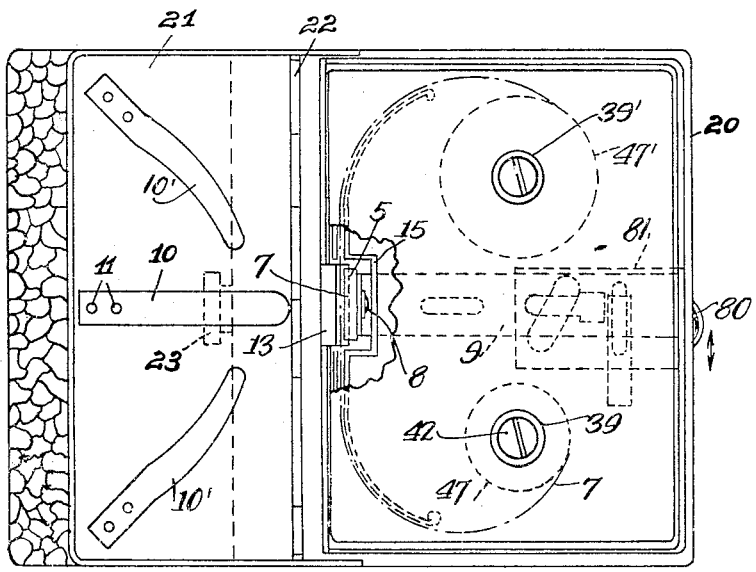
Fig. 2 is a view of the same camera with the magazine viewed from the left-hand side, the magazine cover being partly broken away.

Referring at first to Figs. 1 and 2, the camera and the film magazines are constructed as follows:

The cinematograph camera is designated by the numeral 20, and its objective by the numeral 23. The camera contains a detachable film magazine 24. The chamber for this magazine is covered by a door-like cover 21 hinged to the camera enclosure at 22. The magazine contains two film spools 47 and 47', as indicated in Fig. 2. The film 7, coming from spool 47', is led to the take-up spool 47 so as to pass between a film gate 1 and a pressure plate 5 holding the film against the gate. 39' designates a feed shaft and 39 a take-up shaft forming parts of the camera. The camera contains a mechanism for actuating the take-up shaft 39. The mechanism is disposed in the lower part of the camera enclosure with relation to the view shown in Fig. 1. The pressure plate 5 is mounted to the camera, as will be described hereinafter. The wall of the magazine 24 forms a recessed part 15, allowing the pressure plate 5 to catch behind the film when inserting the magazine into the magazine chamber of the camera. During the insertion of a magazine, the feeding shaft 39' and the take-up shaft 39 pass through the axle holes of the spools 47' and 47. In order to limit the lateral clearance of the film 7, a plate spring 10 is secured to the cover 21 by means of rivets 11. Two springs 10', fixed to cover 21, secure the magazine 24 and all parts connected thereto in their proper places.

A knob 80 serves to lock the cover 21 in its closed position and at the same time to move the pressure plate 5 in the direction towards or away from the film 7. Plate 5 is resiliently mounted to an angle piece 9. This piece 9 is secured to the camera so as to be movable axially with reference to the illustration in Fig. 2. A transmission 81 connected to knob 80 and coupled with angle piece 9 causes piece 9 to move back or forth when knob 80 is actuated and moves in the direction of the arrow shown in Fig. 2.

The structure and operation of the film guiding means will now be described in detail with reference to Figs. 3 and 4 in connection with the above described Figs. 1 and 2.

Figs. 3 and 4 refer to the application of double wide films provided with two rows of pictures, the films being subsequently subdivided in the longitudinal direction into two strips. The film gate 1 firmly held in its position by spring 10 presents an exposure window 2 which is immediately adjacent to an opening 3 for the passage of a feeding claw and, if desired, of a registering finger.

Around the exposure window 2 is arranged a slightly raised edge 4 against which the film 7 is pressed by the pressure plate 5 (Fig. 4) mounted to angle piece 9 by means of screws 8. The upper surface of the edge 4 lies, of course, exactly in the focussing plane of the objective.

A ledge-shaped projection 6 which forms the inner lateral guide for the films of the different widths to be exposed in the camera is provided on the edge of the film gate plate 1. The film indicated in Figs. 1, 2 and 4 by a dash and dot line and denoted by the numeral 7 has a double width so as to be provided with two rows of pictures.

The pressure plate 5 is secured to an angle piece 9 by means of screws 8 (Fig. 4), the angle piece being so arranged with respect to the locking member of the camera casing that upon opening the camera the pressure plate is withdrawn a sufficient distance, i. e., the film channel is opened, whereas it is closed automatically by moving the locking member 80 into the closed position.

When closing the camera cover 21 the free end of the plate spring 10 is pressed onto the upper edge 13 of the film gate plate 1. Upon opening the cover, the plate spring is automatically moved away from this position and, consequently, does not prevent the removal of the magazine from the camera or the insertion of another magazine.

The film 7, for instance 16 mm. in width, to be exposed is preferably employed in a magazine whose film guide parts are so arranged and cooperate with the guide parts in the camera that the film does not change its position with respect to the magazine when inserting the latter into the camera.

By reference to Figs. 5 to 7, the use of a film already cut to the substandard size in the same camera will now be described.

A film only 8 mm. in width and provided with one row of pictures is shown in Fig. 5 and indicated in Figs. 6 and 7 by a dash and dot line denoted by the numeral 14. This film may, for instance, be made by cutting a narrow film 16 mm. in width in the longitudinal direction; it differs, however, as well as the film 7 shown in Fig. 4 from the ordinary narrow films 16 mm. in width by the fact that the distance between the perforation holes is only half as great as in the case of ordinary films.

Owing to the smaller width of this film also the magazine containing the same presents a correspondingly smaller thickness. The lower part of this magazine also is provided with a recess as indicated at 15 which forms the space necessary for the film gate and the pressure plate. The magazine cover 24' is provided with a similar recess 17 which has, however, a smaller width than the recess of the lower part of the magazine 24. The projections 17' of the magazine cover 24' thus formed, contact after the magazine has been inserted into the camera with shoulder-shaped projections 18 of the film gate plate 1 which have an accurate distance from the lower guide ledge 6 of this plate. In this manner, also the film cut to the substandard size is laterally guided at the exposure opening in an accurate manner in both directions.

The space inside the camera left free by narrow magazines according to Figs. 5 and 6 may be used for inserting another magazine of the same size. However, the magazines may be also designed in the form of a double magazine and loaded with two films cut to the substandard size. Such a magazine may be brought into engagement with the mechanism of the camera in two positions in the same manner as a magazine containing a wide film to be provided with two rows of pictures. In this case, only the take-up core of the one film to be exposed is brought into engagement with the mechanism of the camera and only this one film is advanced by a feeding claw arranged only on one side.

In a magazine thus designed the recess 17 in Fig. 7 is to be provided in a partition wall of both film compartments, whereas the recessed walls 15 in Fig. 7 should be provided both above and below this partition wall.

It results from the foregoing that a camera according to the invention is adapted to be supplied with three different types of magazines:

1. Magazines for a film on which a plurality of rows of pictures can be taken.
2. Magazines for a narrower film cut to the substandard size.
3. Double magazines for two films cut to the substandard size.

Any suitable materials may be employed for the magazine. It is possible to manufacture the magazine of sheet iron as well as of pressed synthetic resin or the like. The invention is not limited to the embodiments shown; it may be modified in various respects; for instance, the support surfaces 13 and 18 for the means causing the lateral guide may be further subdivided, that is to say between various supporting surfaces for the guide means of the wide film also supporting surfaces for the guide means of a narrow film may be arranged. Furthermore, the device may be also so designed as to guide films of more than two different widths.

The coupling means necessary between the take-up shaft 39 and the take-up spool 47, both shown in Fig. 1, are preferably of the resilient type. For instance, the shaft 39 may have a radially protruding spring which engages a notch in the body of the take-up spool so as to establish a positive driving connection. These coupling means are not illustrated, as they may be of conventional type. A particularly advantageous construction of such means is described in my copending application, Serial No. 248,046, filed December 28, 1938.

I claim as my invention:

1. In a cinematograph camera having a driving mechanism and being designed for selectively accommodating magazines containing spools for substandard single-row films and magazines containing double width spools for films allowing the successive production of two picture rows, in combination, means for detachably connecting said mechanism with the spools of the magazine to be inserted, film-guiding means having a guiding plate provided with an exposure window and presenting a guiding surface at one side of said window, said plate having two shoulders disposed at the other side of said window parallel to said guiding surface, said shoulders being spaced from said surface according to the width of said single-row films and designed to abut against an inserted magazine for substandard films whereby the film of said latter magazine is laterally guided between said guiding surface and the abutting portion of said magazine, the portion of said plate between said shoulders being designed to form part of means for guiding said double width films.

2. In a cinematograph camera having a driving mechanism and being designed for selectively accommodating a magazine containing spools for single-row films and a magazine containing spools for double-row films of double width, in combination, means for coupling said mechanism with the spools of the magazine to be inserted, film guiding means having a guiding plate provided with an exposure window and forming a guiding surface at one side of said window, said plate having two parallel surfaces located at the other side of said window, said two other surfaces being differently spaced from said first guiding surface so as to form two different abutments for establishing a second lateral film guidance, and resilient means for holding the film in its proper position against said guiding plate.

3. A cinematograph camera for accommodating a narrow magazine containing spools for single-row films and a wide magazine containing spools for double-row films, comprising in combination a camera body having a driving mechanism and a chamber for the insertion of said magazines, a cover for closing said chamber, means in said chamber for coupling said mechanism with the spools of an inserted magazine, film guiding means disposed in said chamber and having a guiding plate provided with an exposure window and forming a guiding surface at one side of said window, said plate having a shoulder disposed at the other side of said window parallel to said guiding surface and spaced from said surface according to the width of said single-row films so as to form an abutment for contacting said narrow magazine in order to guide said single-row films, said plate further having a projecting portion forming a second abutment parallel to said guiding surface and spaced from said surface according to the width of said double-row films, and a resilient member secured to said cover so as to press upon said abutment when said cover is closed in order to guide said double-row films.

OTTO STEINER.